US006336264B1

(12) United States Patent
von Borstel et al.

(10) Patent No.: US 6,336,264 B1
(45) Date of Patent: Jan. 8, 2002

(54) METHOD AND APPARATUS FOR LOOSENING AND REMOVING CONNECTION BOLTS

(75) Inventors: Ralf von Borstel, Hechthausen; Reinhard Czaja, Hamburg; Frank Kuehn, Sendenhorst; Claas Hiestermann, Ahausen; Husnu Can, Hamburg; Falco Sengebusch; Mario Meyer, both of Moelln; Marc Peters, Hamburg; Meiko Kaninck, Harmstorf, all of (DE)

(73) Assignee: DaimlerChrysler Aerospace Airbus GmbH (DE)

( * ) Notice: Subject to any disclaimer, the term of this patent is extended or adjusted under 35 U.S.C. 154(b) by 0 days.

(21) Appl. No.: 09/503,548

(22) Filed: Feb. 14, 2000

(30) Foreign Application Priority Data

Feb. 13, 1999 (DE) ........................................ 199 06 126

(51) Int. Cl.[7] ................................................ B23P 19/04
(52) U.S. Cl. ........................................ 29/267; 269/238
(58) Field of Search .......................... 29/267, 234, 235; 269/238

(56) References Cited

U.S. PATENT DOCUMENTS

| | | | | |
|---|---|---|---|---|
| 3,237,291 A | | 3/1966 | Kelso | |
| 3,736,816 A | * | 6/1973 | McAffee | 269/238 |
| 3,909,889 A | * | 10/1975 | Emerson | 24/248 |
| 4,052,047 A | * | 10/1977 | Bailey | 269/238 |
| 4,366,606 A | * | 1/1983 | Willis | 269/238 |
| 4,382,591 A | * | 5/1983 | Minnis | 269/238 |
| 4,434,978 A | * | 3/1984 | Kloster | 269/238 |

FOREIGN PATENT DOCUMENTS

| | | |
|---|---|---|
| DE | 1300471 | 7/1969 |
| DE | 4434152 | 1/1995 |
| DE | 19803732 | 12/1999 |

* cited by examiner

*Primary Examiner*—Joseph J. Hail, III
*Assistant Examiner*—Daniel Shanley

(57) ABSTRACT

A connection bolt arrangement typically used for connecting two structural members to each other, for example in aircraft construction, includes a conically tapered connection bolt that is force-locked or frictionally engaged in an expansion sleeve so as to cause a radial outward expansion of the sleeve and thereby tightly hold the structural components. An apparatus for releasing such a connection bolt arrangement includes two levers that are pivotably connected to each other, a stamping actuator arranged between respective first ends of the two levers, a pulling extraction device mounted at the second end of the first lever, and a pushing block mounted at the second end of the second lever. The actuating force applied by the actuator is transmitted through the levers and applied to the connection bolt and to the expansion sleeve in opposite directions so as to tend to push the bolt out of the sleeve. The extraction device additionally applies a tension pulling force to the connection bolt relative to the expansion sleeve. The combination of the pressing forces and the tension pulling force releases the connection bolt from the expansion sleeve. The tension pulling force is developed by applying a turning torque to the extraction device.

21 Claims, 4 Drawing Sheets

METHOD AND APPARATUS FOR LOOSENING AND REMOVING CONNECTION BOLTS

PRIORITY CLAIM

This application is based on and claims the priority under 35 U.S.C. §119 of German Patent Application 199 06 126.2, filed on Feb. 13, 1999, the entire disclosure of which is incorporated herein by reference.

FIELD OF THE INVENTION

The invention relates to a method and an apparatus for loosening and removing a tightly connected bolt arrangement that secures two structural components together, for example, the structural surface panels of an aircraft.

BACKGROUND INFORMATION

It is common in the field of aircraft construction, and also in the construction of other vehicles and various structural assemblies, to use connection bolts to connect or secure together plural structural components with each other. For example, the surface structural components such as fuselage panels of an aircraft are typically connected together by such connection bolt arrangements. Each connection bolt arrangement includes a connection bolt or stud arranged within an expansion sleeve. This connection bolt arrangement passes through a bored hole in the two structural components that are to be connected together. Due to a wedge-shaped or conical configuration of the exterior of the connection bolt and the interior of the expansion sleeve, a tight wedging or clamping effect between the connection bolt and the expansion sleeve, and between the expansion sleeve and the two structural components, is achieved when the connection bolt is driven into the expansion sleeve.

Thereby, the wedging effect causes the connection bolt to be tightly held in the expansion sleeve in a force-locking or pressure-locking manner. The terms "force-locking" or "pressure-locking" herein relate to a frictional contact and connection that does not involve a positive form-locking connection. Furthermore, the connection bolt may be threaded or otherwise configured to provide an additional degree of connection between the connection bolt and the expansion sleeve. The term "bolt" throughout this specification is not limited to a threaded bolt, but instead also encompasses an unthreaded bolt or stud or pin.

Once the above described type of connection is established, it is considered to be a substantially permanent connection. Nonetheless, occasionally such connections need to be loosened and removed in order to disassemble the two connected structural components, for example if an assembly error or defect has been discovered. A tool known as a so-called "big C" in the field of aircraft construction has traditionally been used for releasing such expansion bolt connections of mutually secured surface panels of an aircraft. Such a tool is particularly exemplified by tool No. 98 D 55307530 sold by DLH Frankfurt, Federal Republic of Germany. This tool generally consists of a C-shaped planar body with a hand-operated spindle drive mechanism, and generally operates according to the principle of a C-shaped screw clamp or C-clamp. This tool releases the above described bolt connection solely by applying a compression force against the expansion sleeve and the connection bolt that is force-locked therein, whereby this compression force is applied by the threaded spindle of the tool in the axial direction of the spindle. The required compression force is generated solely by a rotational moment or torque that is manually applied to the spindle mechanism. This is disadvantageous in view of the very high applied compression forces that are necessary for releasing such bolt connections.

A further disadvantage is that the tool is relatively large, cumbersome, and heavy, and cannot be disassembled into individual parts for transport and storage, whereby these parts can then be reassembled to form the complete tool at the worksite for example. Thus, the known tool must always be transported, stored, handled, and used at its final utilization location in its complete cumbersome configuration. Due to the high weight and large size of the tool, it is necessary to use great care in preparing the disassembly site at which the bolt connection is to be removed, and several people are required for handling the tool and mounting it at the work location. A single person is barely or not at all able to handle the so-called "big C", and even then only with great physical effort. In practice, it is often the case that several attempts of applying the compressive force to the bolt connection are necessary for ultimately releasing the bolt, whereupon the bolt then suddenly is released in a sudden impact or jump-like manner. It is thus not possible to avoid the situation that the large heavy tool falls down when the connection is suddenly released, whereupon injuries to the workers and damage of the structural components can arise.

A further shortcoming of the known tool is that the spindle drive mechanism suffers great wear due to the extreme compression loads that must be applied to the bolt connection each time such a connection is to be released. Since the entire required release force must be generated by the rotation of the spindle drive, the spindle threading and the like are subjected to wear.

The technological background in the present context of removing such bolt connections is also exemplified by the disclosures of U. S. Pat. No. 3,237,291, and German Patent Publications DE-AS 1 300 471, DE 198 03 732 A1, and DE 44 34 152. While these patent publications disclose the general background or state of the art in this field, they do not disclose a tool and a method for removing connection bolts of the above described kind, which are able to overcome the above mentioned disadvantages of the prior art.

SUMMARY OF THE INVENTION

In view of the above, it is an object of the invention to provide a method and an apparatus for loosening and removing, or generally releasing, connection bolt arrangements that mechanically secure two or more structural components to each other. More particularly, it is an object of the invention to provide such an apparatus and a method, whereby the required forces are not entirely manually applied, and particularly are not entirely applied by a single torque applied to a single rotatable spindle. The invention further aims to minimize the likelihood of damage being caused to the structural components during the operation of mounting the apparatus, releasing the bolt connection, and then de-mounting the apparatus from the structural components. The degree of wear of the parts of the apparatus is to be reduced. The effort involved in releasing such bolt connections as well as the danger of injuries and the like are to be reduced or minimized through the invention, while also making the apparatus more easily handleable, storable, and transportable. The invention further aims to avoid or overcome the disadvantages of the prior art, and to achieve additional advantages, as are apparent from the present specification.

The above objects have been achieved in an apparatus or tool for releasing a connection bolt arrangement that includes a connection bolt fitted into an expansion sleeve, and that mechanically secures together at least two structural components. The apparatus includes two levers that are pivotally connected to each other, and a stamping actuator arranged between the two levers to apply a stamping force to the levers and thereby cause the levers to pivot relative to each other about the pivot joint connecting the two levers.

A first one of the levers has an opening or recess therein, with dimensions adapted to the outer dimension of a protruding end of the expansion sleeve, and to the outer dimension of an end of the connection bolt received in the protruding end of the expansion sleeve, so that the end surface of the expansion bolt is received in the recess and rests against a support shoulder thereof, while the connection bolt can freely move into the opening at the center of the recess in the first lever. The second lever has a pressing block that is configured and adapted to receive and press against a bolt head end or narrower tapered end of the connection bolt without pressing against the expansion sleeve. Thereby, a force applied by the stamping actuator is transferred through the two levers to apply respective pressing forces to the connection bolt and the expansion sleeve in such opposite directions and in such a manner to tend to push the connection bolt out of the expansion sleeve and thereby release the bolt from the sleeve.

Furthermore, a pulling extraction device is mounted on the first lever so as to engage the larger-diameter end of the connection bolt and apply a pulling or tension force to the connection bolt relative to the first lever, whereby this pulling force further tends to pull the connection bolt out of the expansion sleeve. The combination of the pulling force and the pushing forces applied to the connection bolt arrangement release the frictional or force-locked engagement of the bolt in the expansion sleeve, and move the bolt at least partially out of the sleeve. Thereafter, the tool is removed from the connection bolt arrangement and the released bolt arrangement can be removed from the structural components that it was securing.

The above objects have further been achieved according to the invention in a method of releasing a connection bolt arrangement including a connection bolt fitted into an expansion sleeve. This method is carried out using a tool that has two levers pivotally connected to each other and a pulling extraction device mounted on one of the levers. According to this method, the levers are pivoted relative to each other about a pivot joint so that the first lever pushes against the expansion sleeve in a first direction, while the second lever pushes against the connection bolt in a second direction opposite the first direction. Thus, the pushing forces applied by the first and second levers to the connection bolt arrangement have a tendency, or are applied in a direction, to push the connection bolt out of the expansion sleeve. Moreover, the method further includes applying a pulling tension force to a first end of the bolt relative to the first lever using the pulling extraction device, This pulling force tends to pull the connection bolt out of the expansion sleeve. The combination of the pushing forces applied by the levers and the pulling force applied by the pulling extraction device finally releases the connection bolt from the expansion sleeve, so that the bolt and sleeve may be removed from the structural components that were being mechanically connected by the connection bolt arrangement.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
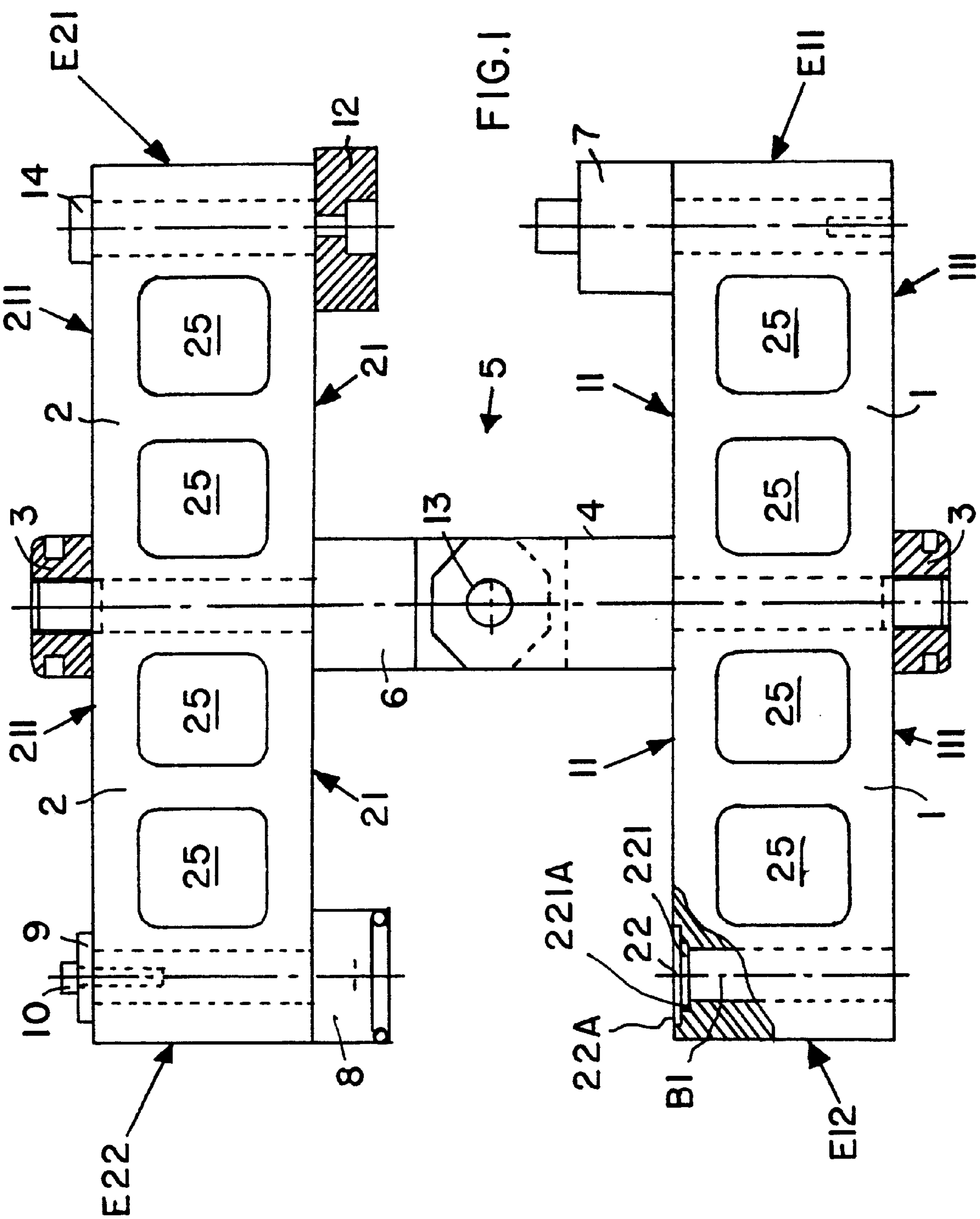
FIG. 1 shows the apparatus according to the invention for releasing connection bolt arrangements, by itself, i.e. not mounted on a connection bolt arrangement that is to be released.

FIG. 1 shows a tool or apparatus according to the invention, which is made up of a number of individual parts or components that can be assembled together to form the tool or disassembled as needed for convenient storage and transport of the apparatus. Thus, the various parts form a kit that can be assembled as needed to form the completed tool. The tool comprises a first lever member 1 and a second lever member 2, which each have a generally rectangular shape with cut-outs or openings 25 to provide a reduced weight with good structural strength and rigidity of the levers 1 and 2. In this detailed description, the lever members will be called simply "levers 1 and 2" for brevity. However, it should be understood that each overall "lever" can be regarded as an assembled combination of several components. For example, a "first lever" may include the first lever member 1, with a forked body or pronged body 4, and a mounting fixture block 7 assembled thereon, while a "second lever" may include the second lever member 2, with a forked body or pronged body 6, a mounting fixture block 12, and a pressing block 8 assembled thereon. The details of the several individual components will be described in detail in the following.

As shown in FIG. 1, the levers 1 and 2 are in a generally horizontal or parallel position and respectively have inner side surfaces 11 and 21 that face each other. In this context, the phrase "substantially horizontal or parallel position" refers to a general position that allows a certain degree of mobility in view of the intended pivotal connection between the two levers in an angular range of ±5° from the parallel position shown in FIG. 1. Also, since the tool or apparatus is a manually portable and useable tool, it can of course be arranged in various orientations as needed, and is not limited to an exactly horizontal arrangement of the levers 1 and 2. More accurately, in other words, the illustrated embodiment involves the levers 1 and 2 being "substantially parallel" within the range of pivotal motion of ±5° as mentioned above.

Figure 1A:
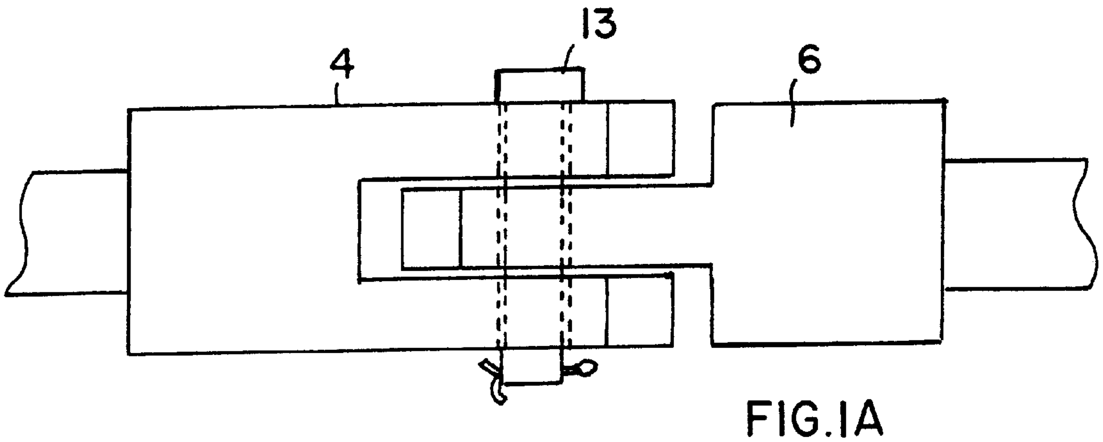
FIG. 1A shows a side view of interengaged forked or pronged members of the apparatus of claim 1.

The two levers 1 and 2 are pivotally connected to each other by a pivot joint arrangement, which includes, in this embodiment, two pivot links or forked or pronged bodies 4 and 6 and a pivot pin or joint 13 which pivotally connects these forked or pronged bodies 4 and 6 to each other. Each one of the forked or pronged bodies 4 and 6 has a respective one-pronged or two-pronged or multi-pronged fork at one end thereof and a protruding bolt at the other end thereof, whereby the fork and the protruding bolt extend along the basic body axis of the forked body. The two forked ends of the two forked bodies 4 and 6 are overlappingly engaged or intermeshed with each other, and the pivot pin 13 passes through a hole through the forked ends so as to pivotally interconnect the forked ends to each other. The pivot pin may be secured by a cotter pin or a clevis pin or the like at its end opposite its head. This arrangement is schematically shown in the side view of FIG. 1A.

Figure 3:
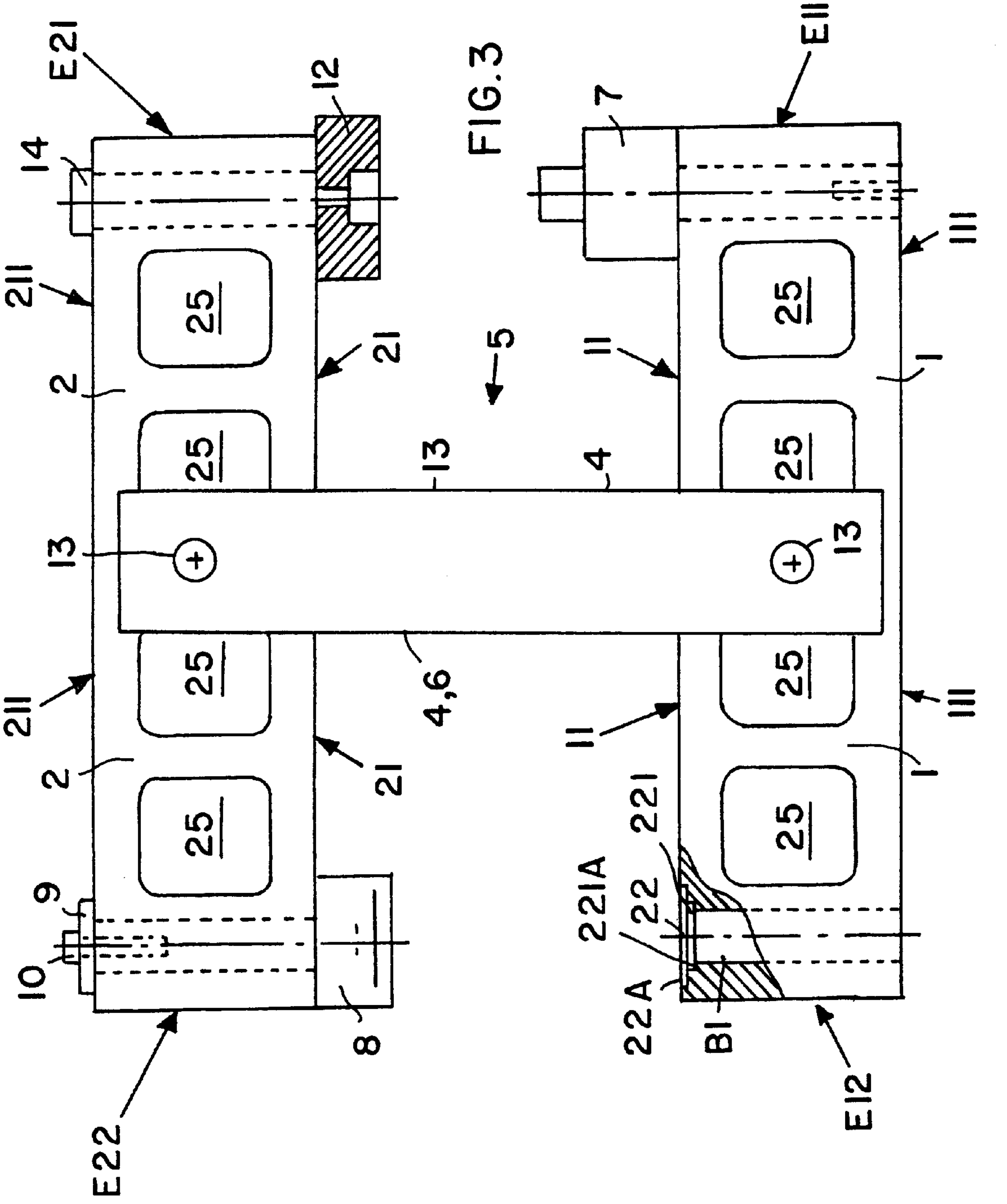
FIG. 3 shows an alternative embodiment with two pivot axes.

The protruding bolt at the opposite end of each forked body passes through a bored hole through the levers 1 and 2 respectively, generally near the middle of the length of each lever 1 and 2 in the present embodiment. In alternative embodiments, the forked bodies 4 and 6 may be arranged closer to one end than the other of each lever 1, 2, or even directly at one end of each lever 1, 2 (whereby the actuator as described below is arranged along the middle portion of the length of the levers), in order to achieve different force transmission or lever arm ratios of the tool. In any event, the main body portion of each forked body 4 and 6 rests against the inner side surface 11, 21 of the levers 1, 2 in a T-butt manner. Then, a threaded nut 3 is tightened onto the free end of the protruding bolt of each forked body 4, 6, whereby the nut 3 is tightened against the outer side surfaces 111, 211 of the levers 1, 2 respectively. Such an arrangement of forked bodies 4 and 6 provides a single pivot axis coincident with the pivot pin 13. Alternative embodiments are possible. For example, the two levers 1 and 2 can be interconnected by two parallel cross-connect plates with the levers received therebetween, whereby a respective pivot pin connects each lever respectively to the plates. Thus, each lever would have its own associated pivot pin connecting it to the two plates, so that the apparatus would have two pivot axes, for example as shown in FIG. 3. Another alternative involves a single cross-connect plate, whereby each lever is made up of two plates which receive rtte the respective end of the cross-connect plate therebetween. A respective pivot pin connects each lever to the respective opposite ends of the cross-connect plate.

As further shown in the embodiment of FIG. 1, a mounting fixture block 12 having a generally cylindrical configuration is secured onto the inner side surface 21 of the second lever 2 near the right end or "actuated end" E21 thereof by a holding bolt 14 passing through the second lever 2. Any known configuration of the bolt 14 can be used for securing the mounting fixture block 12. For example, the bolt 14 may protrude from the block 12 and engage an internal threading in a through-bore of the lever 2 with an external threading of the bolt 14. Alternatively, a head of the bolt 14 may be supported against the outer surface 211 of the lever 2, while the block 12 is threaded onto an end of the bolt 14.

A pressing block or pressing member 8 is mounted and secured on the inner side surface 21 of the second lever 2 near the left end or "free end" or "working end" E22 thereof, whereby the securing is achieved in a similar fashion as for the mounting fixture block 12 or the forked body 6. In the specific embodiment shown in FIG. 1, the protruding bolt of the pressing block 8 that passes through the second lever 2 has an internally threaded blind hole in the free end thereof, and a threaded screw 10 is threaded into this blind hole, so that the head of the screw 10 tightly presses against the outer side surface 211 of the lever 2, preferably with a washer 9 therebetween, so as to secure the pressing block 8 tightly against the inner side surface 21 of the lever 2.

In a similar manner as the above mentioned mounting fixture block 12 and/or the above mentioned pressing block 8, another mounting fixture block 7 is secured to the first lever 1 near the right end or "actuated end" E11 thereof. Particularly in the illustrated embodiment, the mounting fixture block 7 is secured with a screw (not shown) screwed into an internally threaded blind hole in an end of a protruding bolt of the mounting fixture block 7 that extends through a bore hole in the lever 1, in a manner similar to the securing of the above described pressing block 8. The screw is tightened until the mounting fixture block 7 is pulled tightly against the inner surface 11 of the first lever 1.

A generally cylindrical first recess 22 in the manner of a shallow bored hole is provided in the inner side surface 11 of the first lever 1 near the left end or "free end" or "working end" E12 thereof. A second recess 221 adjoins the first recess 22. The second recess 221 has a greater depth as measured from the inner side surface 11, but a smaller diameter than the first recess 22. The second recess 221 also generally has the form of a shallow bored hole, coaxial with the first recess 22. This combination of the first recess 22 and the second recess 221 forms a first step or support shoulder 22A and a second step or support shoulder 221A, which are significant for the operation of the tool as will be described below. Furthermore, coaxially with the first recess 22 and the second recess 221, a through-going bore B1 extends from the recesses 22 and 221 entirely through the lever 1 to the outer side surface 111 thereof.

Figures 2, 2A:
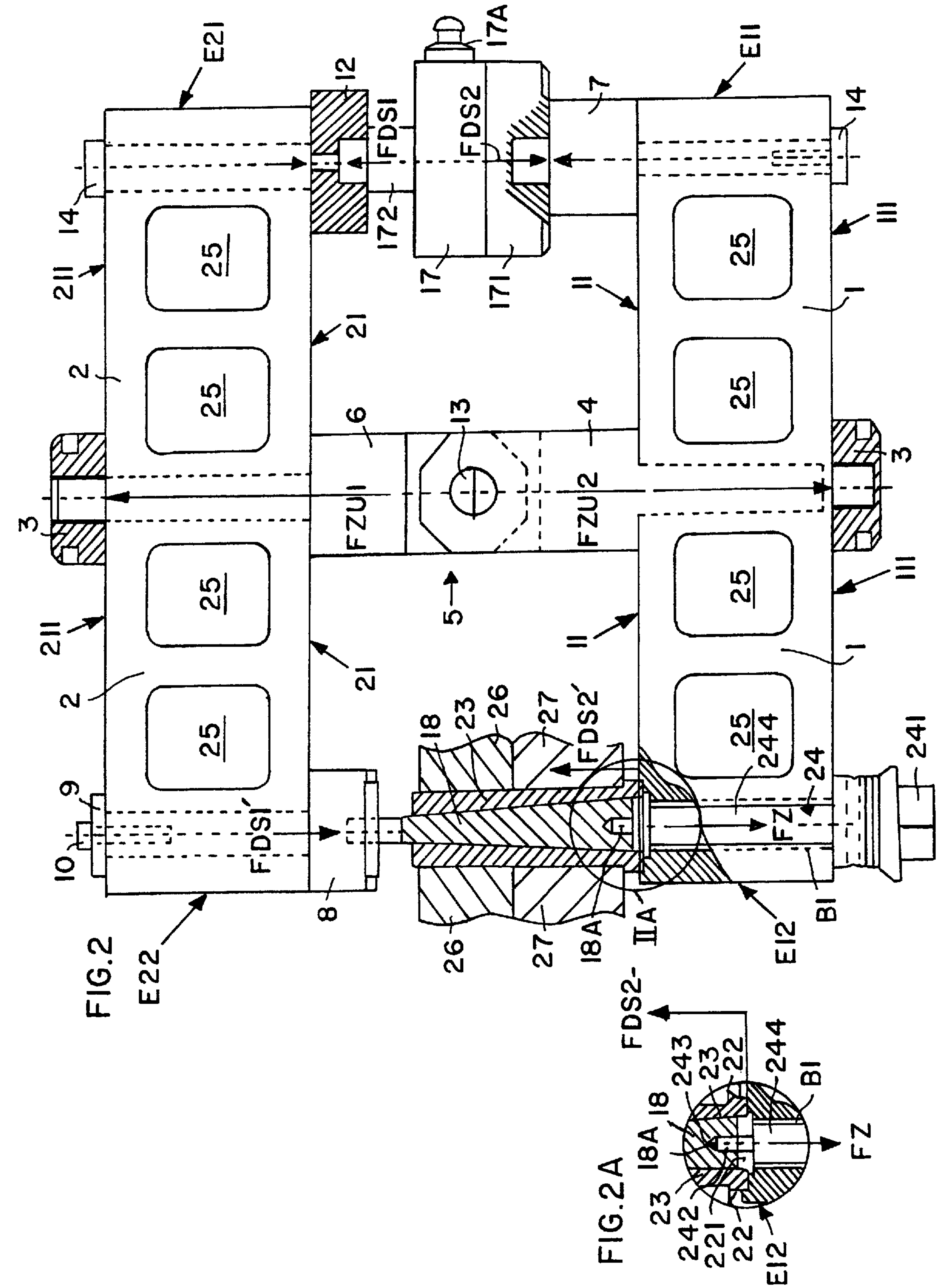
FIG. 2 shows the apparatus according to FIG. 1, further arranged in combination with or mounted on a connection bolt arrangement that is to be released, wherein some portions of FIG. 2 are shown in section.
FIG. 2A is a detail view of the detail portion IIA shown in FIG. 2.

Referring now to FIG. 2, further components of the apparatus are illustrated and will be described, in order to complete the tool. Specifically, at the right ends E11 and E21 of the levers 1 and 2, a stamping actuator 17 is arranged between the two mounting fixture blocks 7 and 12 at a location displaced or offset from the pivot axis defined by the pivot pin 13, and a pulling extraction device 24 is arranged in the bored hole B1 near the left end E12 of the first lever 1. It should also be understood that the levers 1 and 2 can alternatively be pivotally connected by the pivot joint arrangement 5 positioned at one end of each lever, while the stamping actuator 17 is arranged more centrally along the length of the levers In any event, the position of the various components is selected to achieve the required balance of a force transmission ratio based on the operative lever arm lengths, in comparison to the stroke distance transmission ratio which also depends on the operative lever arm lengths.

The stamping actuator 17 will apply pressing forces or actuating forces FDS1 and FDS2 through the mounting fixture blocks 12 and 7 into the second lever 2 and first lever 1 respectively at the first ends E21 and E11 thereof. Thereby, the levers 1 and 2 will be caused to pivot about the pivot pin or joint 13, thus applying transmitted pressing forces FDS1' and FDS2' from the second ends E12 and E22 of the levers 1 and 2 into the connection bolt arrangement as will be described in more detail below. In order to apply the actuating force, the stamping actuator 17 generally comprises a cylinder body with one or two movable pistons arranged therein, such that the one or two pistons are extendable and retractable relative to the cylinder body. If there is only one piston, this piston is movable relative to the cylinder body. On the other hand, if two pistons are provided, they are mutually opposed to each other and both extendable in opposite directions respectively from the cylinder body. In the illustrated embodiment, the cylinder body itself forms one stamping head 171, while a second stamping head 172 is formed by the extendable piston. These stamping heads 171 and 172 form the actuator output members that respectively bear against and transmit forces into the mounting fixture blocks 7 and 12. The mounting fixture blocks have respective configurations adapted to mate with or engage and prevent lateral displacement of the stamping heads 171, 172 of the actuator.

In the illustrated embodiment, the stamping actuator 17 is a hydraulic or pneumatic actuator, whereby a hydraulic fluid or a pneumatic gas under pressure is provided to a nipple or port 17A through an appropriate pressure line in order to drive the stamping actuator 17 selectively as needed. As an alternative to such a hydraulic or pneumatic stamping actuator, and electrical actuator including an electric motor and a worm spindle or screw jack or any electrically powered force transmitter unit or the like could be used and positioned between the two mounting fixture blocks 7 and 12 as an alternative. In any event, the mounting fixture blocks 7 and 12 are appropriately configured respectively with a protruding mounting stub and a mounting hole, to engage correspondingly shaped features of the stamping heads 171 and 172 so that the stamping actuator 17 is reliably held in position once it is partially extended or actuated as shown in FIG. 2. In any event, the stamping actuator 17 can selectively apply a pressing or extending force on the one hand, or a retracting or tension force on the other hand to correspondingly pivot the levers 1, 2 in a tool-closing direction or a tool-opening direction.

The above mentioned pulling extraction device 24 is preferably inserted into the bored hole B1. The pulling extraction device 24 generally comprises a nut head 241 provided with a hex head configuration or the like that can be engaged by any conventional bolt-tightening or loosening tool such as a torque wrench. The pulling extraction device 24 further comprises a cylindrical body 244 extending from the nut head 241 and having an external threading provided thereon. The nut head 241 is turned onto the external threading of the cylindrical body 244. A further smaller-diameter cylindrical body 242 extends from an end of the larger-diameter cylindrical body 244 opposite the nut head 241. The smaller-diameter cylindrical 242 is also provided with an external threading. The smaller-diameter cylindrical body 242 transitions into and terminates with a conical end body 243. In the condition of the pulling extraction device 24 inserted into the bore B1 as shown in FIG. 2, the smaller-diameter cylindrical body 242 extends through the first and second recesses 22 and 221, and the conical end body 243 protrudes upwardly from the inner side surface 11 of the first lever 1 toward the pressing block 8 mounted on the second lever 2. Once the tool is mounted and engaged on a connection bolt arrangement that is to be released, the threaded smaller-diameter cylindrical body 242 and the conical end body 243 will engage an end of the connection bolt as will be discussed in detail below.

The apparatus or tool according to the invention as shown in FIGS. 1 and 2 can be used for releasing a connection bolt arrangement that includes a connection bolt 18 and an expansion sleeve 23, and that secures together two structural members 26 and 27, such as structural plates or panel members 26 and 27 of an aircraft fuselage. In such a connection bolt arrangement, the connection bolt is typically conically tapered from a first end or larger diameter end to a second end or smaller diameter end. The inner bore or passage through the expansion sleeve 23 is similarly conically tapered from a first larger diameter end to a second smaller diameter end, while the outer diameter of the expansion sleeve 23 is substantially continuous and cylindrical. The bolt 18 is tightly pressed into the expansion sleeve 23, whereby the conically tapered configuration causes a wedging effect, which in turn causes a radially outward expansion of the sleeve 23, so that the expansion of the expansion sleeve 23 radially outwardly tightly secures the connection bolt arrangement to the structural members 26 and 27, and thereby secures the structural members 26 and 27 to each other. Such an arrangement is shown in FIG. 2. Thereby, the connection bolt 18 is force-locked or frictionally held in the expansion sleeve 23 in the secured condition. The bolt head or second narrower end of the bolt 18 protrudes upwardly from the corresponding end of the expansion sleeve 23 and protrudes outwardly from the structural member 26, while the opposite larger-diameter end of the bolt 18 is received within the first end of the expansion sleeve 23 that protrudes from the structural member 27.

In order to use the inventive tool for releasing such a connection bolt arrangement, the left free or second ends E12 and E22 of the levers 1 and 2 respectively equipped with the recesses 22 and 221 (representing a first pressing portion of the first lever) and the pressing block 8 (representing a second pressing portion of the second lever) are positioned in axial alignment with the connection bolt arrangement, while the levers 1 and 2 themselves reach around an end of the structural members 26 and 27. Thus, the length of the levers 1 and 2 extending beyond the axis of the pivot joint arrangement 5 determines the "reach" of the tool to be able to release connection bolt arrangements displaced from the edge of the structural members 26 and 27.

More particularly, the pressing block 8 preferably has a blind hole bored in a center thereof, which is adapted to receive the protruding bolt head or second narrower end of the connection bolt 18 thereon. The tool is positioned so that the bolt head of the bolt 18 is positioned and received and thereby fixed in an accurately positioned manner within this hole in the pressing block 8. Meanwhile, the opposite protruding end of the expansion sleeve 23 is received in the first recess or depression 22, such that the outer face of the protruding end of the expansion sleeve 23 rests on the first step or shoulder 22A. Thus, the diameter of the first recess 22 and the second recess 221 respectively, is selected so that the protruding end of the expansion sleeve 23 is accurately positioned and laterally held in the first recess 22 while resting on the first shoulder 22A. When the tool is operated as will be described below, the connection bolt 18 can be retracted out of the expansion sleeve 18 into the second recess 221 at least in the area between the first shoulder or step 22A and the second shoulder or step 221A. This relative arrangement of the end of the expansion sleeve 23 relative to the recesses of the first lever 1 is shown in detail in FIG. 2A.

The arrangement of the pulling extraction device 24 in the bore B1 and extending through the first recess 22 and the second recess 221 has been described above. It should be further understood that the connection bolt 18 has an internally threaded blind hole 18A in the first larger-diameter end thereof as shown in FIGS. 2 and 2A. Thus, when the pulling extraction device 24 is inserted into the bore B1 as described above, then the cylindrical body 244 is turned so that the small second cylindrical body 242 of the extraction device 24 is threaded into the threaded blind hole 18A while the conical end body 243 comes to contact the bottom or end of the blind hole 18A. Thereby, the extraction device 24 is engaged with the bolt 18. By turning the nut head 241 of the extraction device 24, the nut head is turned further onto the threaded cylindrical body 244 and a pulling force will be applied through the cylindrical body in the blind hole 18A of the bolt 18.

Further embodiments or features of the pulling extraction device 24 are also possible. For example, the shaft or cylindrical body 244 of the device 24 is smaller than the inner diameter of the bore B1 so that it is freely movable therein, i.e. without being thread-engaged in the bore B1. The only threaded engagement is between the smaller cylindrical body 242 and the internal threading of the blind hole 18A in the connection bolt 18, and between the nut head 241 and the threaded cylindrical body 244. Thereby, when the nut head 241 is turned with a wrench, the nut head 241 is threaded further onto the threaded body 244, therety exerting a pulling force onto the bolt 18. Most simply, the nut head 241 is embodied as a nut that can be threaded onto the threaded shaft or cylindrical body 244 of the bolt. In such an arrangement, the smaller cylindrical body 242 is first threaded into the blind hole 18A to engage the bolt body 244 with the connection bolt 18, and then the nut head 241 is threaded onto the protruding end of the bolt shaft or cylindrical body 244, whereby a tightening or turning of the nut head 241 will exert a pulling force on the bolt shaft or cylindrical body 244 so as to exert a pulling force on the connection bolt 18.

The specific operating steps for releasing a connection bolt arrangement using the tool will now be described. It will be understood that a preliminary or preparatory step a) involves assembling the individual parts or components of the tool kit into the complete tool as has been described above. Specifically, the forked bodies 4 and 6 are secured using the nuts 3 respectively to the levers 1 and 2, the mounting fixture blocks 7 and 12 are secured to the levers 1 and 2 in the manner described above, the pressing block 8 is secured to the lever 2 as described above, the pivot pin or joint 13 is installed to secure the forked bodies 4 and 6 pivotally to each other, and the pulling extraction device 24 may be at least partly preinstalled in the bore B1.

In carrying out the preliminary assembly step a), it should be understood that different or variously configured mounting fixture blocks 7 and a pressing block 8 may be used and assembled with the levers 1 and 2 to meet the specific needs of a particular application at hand, e.g. depending on the particular stamping actuator 17 that is to be used, and the length, diameter and configuration of the connection bolt arrangement that is to be released. Moreover, an additional shim body or secondary mounting fixture block can be arranged between one of the mounting fixture blocks 7, 12 and the actuator 17, for example on the mounting fixture block 7, in order that the starting position of the left ends E12 and E22 of the levers 1 and 2 will be closer to each other in order to accommodate shorter bolt connection arrangements, so that a longer or longer-stroking stamping actuator 17 is not needed. Thus, the present apparatus can be easily adapted without significant cost or effort, to various different applications. Moreover, it should be understood that such modular or separable kit-construction is not a required limitation of the invention, but rather the invention also relates to a tool in which the effective pressing block is a unitary part of the second lever (e.g. similar to the recesses 22 and 221 being a unitary part of the first lever and serving a similar pressing function as the pressing block), the mounting fixture blocks are unitary parts of the two levers respectively, and the forked bodies are permanently connected to or unitarily incorporated in the levers. The various mountable blocks are optional, but make the inventive arrangement particularly versatile, adaptable, and portable.

In a subsequent step or measure b), the assembled tool or apparatus is positioned in such a manner on the connection bolt arrangement so that the pressing block 8 is positioned on the protruding bolt head or second end of the connection bolt 18, while the protruding rim of the expansion sleeve 23 is received in the first recess 22 so as to rest against the first shoulder 22A, as described above.

A next step c) involves arranging the stamping actuator 17 between the mounting fixture blocks 7 and 12. In this state, the stamping heads 171 and 172 of the stamping actuator 17 are completely retracted or only partially extended. Thus, the actuator 17 can be positioned and inserted between the two mounting fixture blocks 7 and 12, and the levers 1 and 2 can be pivoted to provide the largest jaw opening between the pressing block 8 and the first recess 22. An additional shim block or secondary mounting fixture block may be arranged between the actuator 17 and one of the mounting fixture blocks 7 and 12, if needed for the reasons discussed above. A slight manual pivoting of the levers 1 and 2, or a slight extending actuation of the actuator 17 will bring the protruding cylindrical stub of the stamping head 172 into engagement with the corresponding cylindrical recess of the mounting fixture block 12, while the protruding cylindrical stub of the mounting fixture block 7 engages the corresponding cylindrical recess provided in the stamping head 171, as has been described above. Thereby, the actuator 17 is securely and properly positioned between the mounting fixture blocks 7 and 12.

Next, a step d) is carried out, in which the pressing block 8 is adjusted on the protruding end or bolt head of the connection bolt 18, and the protruding end or rim of the expansion sleeve 23 is adjusted in the first recess 22, so that the respective components are precisely positioned and engaged with each other as has been described above. This prevents any possible lateral movement or shifting of the apparatus relative to the connection bolt arrangement, and of the components of the connection bolt arrangement relative to each other. Such an adjustment and a defined pre-securing of the tool relative to the bolt connection arrangement before carrying out the actual bolt releasing process is achieved as follows.

First, the apparatus is positioned relative to the bolt head and the protruding rim of the expansion sleeve as described above. Then, a hydraulic pump or other source of pressurized hydraulic fluid provides hydraulic fluid at a preliminary pressure to the stamping actuator 17, which is embodied as a hydraulic actuator in this example. This preliminary pressure of the hydraulic medium is transmitted to the stamping heads 171 and 172 which thus extend or expand the actuator 17 into a partially extended condition so as to push against the mounting fixture blocks 7 and 12 to be secured relative thereto and to close the jaws of the levers 1 and 2 into a preliminary engagement with the connection bolt arrangement as described above. The arising compression or pressing forces FDS1 and FDS2 are transmitted through the mounting fixture blocks 7 and 12 through the levers 1 and 2, thereby causing the levers to pivot about the pivot joint arrangement 5 so as to give rise, through a pivot-lever action, to corresponding or associated transmitted pressing forces FDS1' and FDS2' at the left ends E22 and E12 of the two levers 2 and 1 respectively. As a result, the pressing block 8 exerts the transmitted pressing force FDS1' axially against the protruding end of the connection bolt 8, while the first shoulder 22A of the recess 22 in the left end E12 of the first lever 1 exerts a corresponding pressing force FDS2' against the protruding rim of the expansion sleeve 23 in an axial direction opposed to the transmitted pressing force FDS1'. The forces applied as a result of the preliminary pressure applied by the hydraulic medium to the stamping actuator 17 are only sufficient to position and securely clamp the apparatus relative to the connection bolt arrangement, but are not sufficient to release the connection bolt 18 from the expansion sleeve 23.

Thereafter, a step e) is carried out, in which the pulling extraction device 24 is fully inserted into the bore B1 until the smaller cylinder body 242 reaches the blind hole 18A in the first larger diameter end of the connection bolt 18 and is then threaded thereinto. By carrying out the above steps a) to e), the stage is set for achieving the actual release, or loosening and removal, of the connection bolt 18 from the expansion sleeve 23.

Now the method proceeds with a further step f), wherein the hydraulic pressure provided to the stamping actuator 17 is increased, so as to correspondingly increase the applied actuator forces FDS1 and FDS2, and correspondingly increase the transmitted pressing forces FDS1' and FDS2'. In this context, the forces are preferably increased to about 20 tons, either as measured at the transmitted forces FDS1' and FDS2' or as measured at the actuator forces FDS1 and FDS2, which may or may not be the same as the transmitted forces depending on the lever ratios used in a particular embodiment. Such a 20 ton force applied axially to the connection bolt 18 and the expansion sleeve 23 is generally still not sufficient to release the bolt from the sleeve.

Then, a further step g) is carried out, in which the pulling extraction device 24 is tightened by turning the nut head 241 further onto the threaded body 244. This applies an additional pulling force or tension force FZ to the connection bolt 18 relative to the first lever 1 and thereby relative to the expansion sleeve 23 through the first shoulder 22A. This tension force FZ is developed by turning the nut head 241 of the extraction device 24 with a wrench and particularly a torque wrench, for example in a clockwise direction. Thereby, as the pulling extraction device 24 is further tightened, the threaded smaller cylindrical body 242, which was previously screwed into the blind threaded hole 18A of the connection bolt 18, thereby exerts an increasing tension force FZ, which succeeds in pulling the connection bolt 18 in a slow, controlled manner out of the expansion sleeve 23. Thereby, the connection bolt 18 is retracted out of the connection sleeve 23 while the larger-diameter end of the connection bolt 18 moves progressively further into the second recess 221 until it comes to rest against the second shoulder 221A. In this condition, the connection bolt 18 has been fully released from the expansion sleeve 23, in a slow controlled manner, without any sudden jolt or shock, and the tool still remains reliably engaged with the connection bolt arrangement, because the compression or pushing force FDS1 and FDS2 applied by the stamping actuator 17 has further pivoted the levers 1 and 2 following the retraction movement of the connection bolt 18 relative to the expansion sleeve 23. Generally, the tension force FZ required to release and extract the connection bolt 18 (in combination with the 20 ton pressing force) is about 11 tons. Thus, the total force acting on the connection bolt 18 relative to the expansion sleeve 23 to release the connection bolt arrangement is about 31 tons in the axial direction, but only about 11 tons of that force had to be developed by torquing the nut head 241 of the pulling extraction device 24 and converting the torque into an axial pulling force via the threading of the extraction device.

It is evident that the pivot joint arrangement 5, i.e. the forked bodies 4 and 6 and the pivot joint or pin 13, must support a reaction load that counters the applied actuator force FDS1 and FDS2, and the transmitted pushing force FDS1' and FDS2'. In view of the compressive force effective at the two opposite ends of each of the levers 1 and 2, i.e. the forces FDS1 and FDS2 as well as the forces FDS1' and FDS2', it is understood that the forces applied to the pivot joint arrangement 5 arise as tension forces FZU1 and FZU2. More specifically, while the forked bodies 4 and 6 are under tension along the axial extension direction of the protruding bolts thereof, and this tension is ultimately supported by the nuts 3 against the outer side surfaces 111 and 211 of the levers 1 and 2, on the other hand the pivot pin 13 itself is subjected to shear loading. All the components of the pivot joint arrangement 5, namely especially the forked bodies 4 and 6 including the protruding bolts thereof, the securing nuts 3, and the pivot pin 13, must be appropriately dimensioned and engineered to withstand the forces expected to arise in a given application. Based on a force balance, it is apparent that the pivot joint arrangement 5 must withstand a tension load of about 40 tons in the case in which the stamping actuator 17 applies an actuating force of about 20 tons.

By carrying out the above procedure in which the pressing forces FDS1' and FDS2' as well as the tension force or pulling force FZ are applied to the connection bolt 18 relative to the expansion sleeve 23, the connection bolt 18 will generally be released and removed from the expansion sleeve 23, i.e. the force-locked or frictional engagement therebetween will be loosened and the bolt 18 will be extracted out of the sleeve 23. However, in the event that such a releasing of the connection bolt arrangement is not achieved by carrying out the above steps, the inventive method does not call for increasing the torque applied to the bolt head 241 of the pulling extraction device 24 in order to increase the applied pulling or tension force FZ above about 11 tons. Instead, the following series of steps is carried out.

According to a further step g), the hydraulic pressure applied to the stamping actuator 17 is reduced or removed so as to reduce the applied actuator force of 20 tons that had been generated in the preceding steps. Then the extraction device 24 is loosened or screw-turned back to its starting position. Thereby, the forces that had been applied to the connection bolt arrangement have been removed.

A further subsequent step h) provides that a hydraulic pressure is again applied to the stamping actuator 17 in order to develop a total pressing force of about 20 tons, which is transmitted through the levers 1 and 2, and applied to the connection bolt arrangement as described above. Then the extraction device 24 is again tightened in order to apply a pre-tensioning of up to 11 tons onto the connection bolt 18 relative to the expansion sleeve 23, whereby this tension force is increased to the desired maximum nominal value and then maintained at the nominal value so long until the connection bolt 18 is released from the expansion sleeve 23.

In the event that the above repeated sequence of steps has still not successfully released the connection bolt 18 from the expansion sleeve 23, then the above repetition of steps g) and h) is sequentially repeated as often as necessary until the desired release of the connection bolt arrangement is achieved. In any event, once the bolt 18 has been released from the expansion sleeve 23, the pressure is removed from the actuator, the extraction device is screwed back to its initial position and the apparatus is removed from the working location, whereupon the released bolt connection components 18 and 23 can be removed from the structural components 26 and 27 manually or using simple hand tools.

While the example embodiment described herein uses a threaded bolt as the major tension developing component of the extraction device 24, any other tension-developing extraction device could be used instead. The key feature of the extraction device 24 is that it engages the connection bolt 18 and applies a pulling force directly to the connection bolt 18 relative to the expansion sleeve 23, which is braced against the lever on which the extraction device is mounted. The extraction device 24 may, for example, be a hydraulic or pneumatic piston device, an electric motor driven device, a ratchet device, or a lever connected to a pull rod.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for releasing a connection bolt arrangement including a connection bolt engaged in an expansion sleeve, said apparatus comprising:

first and second levers that are pivotably connected to each other to be relatively pivotable about at least one pivot axis and that each respectively have a respective free end offset from said at least one pivot axis;

a stamping actuator that is arranged between and coupled respectively to said first and second levers at a location offset from said at least one pivot axis and that is adapted to actuate said first and second levers to relatively pivot about said at least one pivot axis; and a pulling extraction device mounted adjacent said free end of said first lever; wherein:

said first lever includes a first pressing portion adjacent said free end of said first lever, said first pressing portion being adapted to engage and apply a first pressing force against a first end of the expansion sleeve in a first pressing direction when said first and second levers are actuated by said actuator to relatively pivot about said at least one pivot axis;

said second lever includes a second pressing portion adjacent said free end of said second lever, said second pressing portion being adapted to engage and apply a second pressing force against a second end of the connection bolt in a second pressing direction opposite said first pressing direction when said first and second levers are actuated by said actuator to relatively pivot about said at least one pivot axis;

said pulling extraction device is adapted to be releasably connected to a first end of the connection bolt which is opposite the second end of the connection bolt and which is adjacent to the first end of the expansion sleeve, and said pulling extraction device is adapted to apply a pulling force to the first end of the connection bolt in a pulling direction parallel to and oriented the same as said second pressing direction;

said pulling force, said first pressing force, and said second pressing force together are effective to be able to release the connection bolt from the expansion sleeve;

said location at which said stamping actuator is arranged is at an actuated end of each of said first and second levers opposite said free end of each of said first and second levers; and said at least one pivot axis is located along said levers between said actuated ends and said free ends.

2. The apparatus according to claim 1, wherein said first lever comprises a first lever member having a first inner side surface, said second lever comprises a second lever member having a second inner side surface, said first and second lever members are arranged with said first and second inner side surfaces respectively facing each other, said first pressing portion of said first lever comprises a first recess in said first inner side surface of said first lever member, said first recess has an outer dimension at least as large as an outer dimension of the first end of the expansion sleeve and has a first support shoulder bounding a recess depth of said first recess so that said first recess is adapted to receive the first end of the expansion sleeve therein with said first support shoulder pressing against the first end of the expansion sleeve, said pulling extraction device extends through said first lever member into said first recess so as to be adapted to engage the first end of the connection bolt in said first recess, said second pressing portion of said second lever comprises a pressing block arranged on said second inner side surface of said second lever member, and said pressing block is configured and adapted to engage and press against the second end of the connection bolt.

3. The apparatus according to claim 2, wherein said first recess and said first support shoulder thereof are configured and adapted so as not to contact the first end of the connection bolt while said first support shoulder is pressing against the first end of the expansion sleeve, and said pressing block is configured and adapted so as not to contact a second end of the expansion sleeve adjacent to the second end of the connection bolt while engaging and pressing against the second end of the connection bolt.

4. The apparatus according to claim 1, wherein said first and second levers are arranged extending substantially parallel to each other within a range of pivotal motion of ±5° about said at least one pivot axis.

5. The apparatus according to claim 1, wherein said at least one pivot axis is located at a midpoint that is halfway between said actuated ends and said free ends.

6. The apparatus according to claim 1, wherein said at least one pivot axis includes only exactly one pivot axis.

7. The apparatus according to claim 1, wherein said first lever comprises a first lever member and a first pronged body protruding perpendicularly laterally from said first lever member, said second lever comprises a second lever member and a second pronged body protruding perpendicularly laterally from said second lever member, said first and second pronged bodies are pivotally interengaged with each other, said apparatus further comprises a pivot joint pivotably securing said first and second pronged bodies to each other such that said pivot joint establishes said at least one pivot axis and provides aid pivotable connecting of said first and second levers to each other.

8. The apparatus according to claim 7, wherein one of said pronged bodies has two protruding fork prongs and the other of said pronged bodies has one protruding tongue prong, and said one tongue prong is received between said two fork prongs in a flush-edged overlapping manner so as to establish said pivotable interengaging of said pronged bodies with each other.

9. The apparatus according to claim 7, wherein said pivot joint comprises a pivot pin extending through aligned pivot holes of said interengaging pronged bodies.

10. The apparatus according to claim 1, wherein said stamping actuator comprises a cylinder body and at least one pressing piston arranged in and movable relative to said cylinder body, and wherein said cylinder body encloses a cylinder chamber with an inlet port adapted to introduce a pressurized hydraulic fluid or pneumatic gas into said cylinder chamber for moving said at least one pressing piston relative to said cylinder body or said actuator further comprises an electrically driven prime mover coupled to said at least one pressing piston for moving said at least one pressing piston relative to said cylinder body.

11. The apparatus according to claim 10, wherein said at least one pressing piston comprises two pressing pistons that are movable in opposition relative to each other with respect to said cylinder body.

12. The apparatus according to claim 1, wherein said first lever has a hole extending therethrough, wherein said hole communicates through and is coaxial with said first pressing portion and is axially oriented toward said second pressing portion of said second lever, wherein said pulling extraction device comprises a shaft, a tool-engageable nut head on a first end of said shaft, and an externally threaded cylindrical tip portion extending from a second end of said shaft opposite said first end of said shaft, and wherein said shaft is adapted to extend through said hole, said tip portion is adapted to be screwed into an internally threaded hole provided in the first end of the connection bolt, and said nut head is adapted to be turned using a tool so as to generate and apply said pulling force to the first end of the connection bolt.

13. A method of operating the apparatus according to claim 1, for releasing a connection bolt arrangement including a connection bolt engaged in an expansion sleeve, wherein said connection bolt has first and second opposite ends respectively adjacent to first and second opposite ends of said expansion sleeve, and wherein said method comprises the following steps:

a) applying said first pressing force to said first end of said expansion sleeve;

b) simultaneously with said step a), applying said second pressing force, directed opposite said first pressing force, to said second end of said connection bolt; and c) at least partially overlapping in time with said steps a) and b), applying said pulling force, in the same direction as said second pressing force, to said first end of said connection bolt;

wherein said steps a), b) and c) together release and move said connection bolt out of said expansion sleeve in the direction of said pulling force and said second pressing force.

14. An apparatus for releasing a connection bolt arrangement including a connection bolt engaged in an expansion sleeve, said apparatus comprising:

first and second levers that are pivotably connected to each other to be relatively pivotable about at least one pivot axis and that each respectively have a respective free end offset from said at least one pivot axis;

a stamping actuator that is arranged between and coupled respectively to said first and second levers at a location offset from said at least one pivot axis and that is adapted to actuate said first and second levers to relatively pivot about said at least one pivot axis; and a pulling extraction device mounted adjacent said free end of said first lever; wherein:

said first lever includes a first pressing portion adjacent said free end of said first lever, said first pressing portion being adapted to engage and apply a first pressing force against a first end of the expansion sleeve in a first pressing direction when said first and second levers are actuated by said actuator to relatively pivot about said at least one pivot axis;

said second lever includes a second pressing portion adjacent said free end of said second lever, said second pressing portion being adapted to engage and apply a second pressing force against a second end of the connection bolt in a second pressing direction opposite said first pressing direction when said first and second levers are actuated by said actuator to relatively pivot about said at least one pivot axis;

said pulling extraction device is adapted to be releasably connected to a first end of the connection bolt which is opposite the second end of the connection bolt and which is adjacent to the first end of the expansion sleeve, and said pulling extraction device is adapted to apply a pulling force to the first end of the connection bolt in a pulling direction parallel to and oriented the same as said second pressing direction;

said pulling force, said first pressing force, and said second pressing force together are effective to be able to release the connection bolt from the expansion sleeve; and said at least one pivot axis includes a first pivot axis extending through said first lever perpendicular to a maximum length of said first lever, and a second pivot axis extending through said second lever perpendicular to a maximum length of said second lever and parallel to said first pivot axis.

15. An apparatus for releasing a connection bolt arrangement including a connection bolt engaged in an expansion sleeve, said apparatus comprising:

first and second levers that are pivotably connected to each other to be relatively pivotable about at least one pivot axis and that each respectively have a respective free end offset from said at least one pivot axis;

a stamping actuator that is arranged between and coupled respectively to said first and second levers at a location offset from said at least one pivot axis and that is adapted to actuate said first and second levers to relatively pivot about said at least one pivot axis; and a pulling extraction device mounted adjacent said free end of said first lever; wherein:

said first lever includes a first pressing portion adjacent said free end of said first lever, said first pressing portion being adapted to engage and apply a first pressing force against a first end of the expansion sleeve in a first pressing direction when said first and second levers are actuated by said actuator to relatively pivot about said at least one pivot axis;

said second lever includes a second pressing portion adjacent said free end of said second lever, said second pressing portion being adapted to engage and apply a second pressing force against a second end of the connection bolt in a second pressing direction opposite said first pressing direction when said first and second levers are actuated by said actuator to relatively pivot about said at least one pivot axis;

said pulling extraction device is adapted to be releasably connected to a first end of the connection bolt which is opposite the second end of the connection bolt and which is adjacent to the first end of the expansion sleeve, and said pulling extraction device is adapted to apply a pulling force to the first end of the connection bolt in a pulling direction parallel to and oriented the same as said second pressing direction;

said pulling force, said first pressing force, and said second pressing force together are effective to be able to release the connection bolt from the expansion sleeve; and each one of said levers respectively comprises a respective lever member having a rectangular block shape with openings passing therethrough perpendicular to a major length of said lever member.

16. An apparatus for releasing a connection bolt arrangement including a connection bolt engaged in an expansion sleeve, said apparatus comprising:

first and second levers that are pivotably connected to each other to be relatively pivotable about at least one pivot axis and that each respectively have a respective free end offset from said at least one pivot axis;

a stamping actuator that is arranged between and coupled respectively to said first and second levers at a location offset from said at least one pivot axis and that is adapted to actuate said first and second levers to relatively pivot about said at least one pivot axis; and a pulling extraction device mounted adjacent said free end of said first lever; wherein:

said first lever includes a first pressing portion adjacent said free end of said first lever, said first pressing portion being adapted to engage and apply a first pressing force against a first end of the expansion sleeve in a first pressing direction when said first and second levers are actuated by said actuator to relatively pivot about said at least one pivot axis;

said second lever includes a second pressing portion adjacent said free end of said second lever, said second pressing portion being adapted to engage and apply a second pressing force against a second end of the connection bolt in a second pressing direction opposite said first pressing direction when said first and second levers are actuated by said actuator to relatively pivot about said at least one pivot axis;

said pulling extraction device is adapted to be releasably connected to a first end of the connection bolt which is opposite the second end of the connection bolt and which is adjacent to the first end of the expansion sleeve, and said pulling extraction device is adapted to apply a pulling force to the first end of the connection bolt in a pulling direction parallel to and oriented the same as said second pressing direction;

said pulling force, said first pressing force, and said second pressing force together are effective to be able to release the connection bolt from the expansion sleeve;

said first lever comprises a first lever member with a first inner side surface and a first mounting fixture block arranged on said first inner side surface;

said second lever comprises a second lever member with a second inner side surface and a second mounting fixture block arranged on said second inner side surface;

said first and second levers are arranged with said first and second inner side surfaces facing toward each other;

said stamping actuator includes two actuator output heads that are movable relative to each other; and said stamping actuator is arranged and received between said first and second mounting fixture blocks with said two actuator output heads received respectively at least indirectly on said first and second mounting fixture blocks.

17. The apparatus according to claim 16, further comprising an additional adjustment shim block interposed between said stamping actuator and one of said mounting fixture blocks.

18. An apparatus for releasing a connection bolt arrangement including a connection bolt engaged in an expansion sleeve, said apparatus comprising:

first and second levers that are pivotably connected to each other to be relatively pivotable about at least one pivot axis and that each respectively have a respective free end offset from said at least one pivot axis;

a stamping actuator that is arranged between and coupled respectively to said first and second levers at a location offset from said at least one pivot axis and that is adapted to actuate said first and second levers to relatively pivot about said at least one pivot axis; and a pulling extraction device mounted adjacent said free end of said first lever; wherein:

said first lever includes a first pressing portion adjacent said free end of said first lever, said first pressing portion being adapted to engage and apply a first pressing force against a first end of the expansion sleeve in a first pressing direction when said f first and second levers are actuated by said actuator to relatively pivot about said at least one pivot axis;

said second lever includes a second pressing portion adjacent said free end of said second lever, said second pressing portion being adapted to engage and apply a second pressing force against a second end of the connection bolt in a second pressing direction opposite said first pressing direction when said first and second levers are actuated by said actuator to relatively pivot about said at least one pivot axis;

said pulling extraction device is adapted to be releasably connected to a first end of the connection bolt which is opposite the second end of the connection bolt and which is adjacent to the first end of the expansion sleeve, and said pulling extraction device is adapted to apply a pulling force to the first end of the connection bolt in a pulling direction parallel to and oriented the same as said second pressing direction;

said pulling force, said first pressing force, and said second pressing force together are effective to be able to release the connection bolt from the expansion sleeve;

said first lever comprises a first lever member having a first inner side surface;

said second lever comprises a second lever member having a second inner side surface;

said first and second lever members are arranged with said first and second inner side surfaces respectively facing each other;

said first pressing portion of said first lever comprises a first recess in said first inner side surface of said first lever member;

said first recess has an outer dimension at least as large as an outer dimension of the first end of the expansion sleeve and has a first support shoulder bounding a recess depth of said first recess so that said first recess is adapted to receive the first end of the expansion sleeve therein with said first support shoulder pressing against the first end of the expansion sleeve;

said pulling extraction device extends through said first lever member into said first recess so as to be adapted to engage the first end of the connection bolt in said first recess;

said second pressing portion of said second lever comprises a pressing block arranged on said second inner side surface of said second lever member;

said pressing block is configured and adapted to engage and press against the second end of the connection bolt;

said first lever member has a bored hole extending therethrough perpendicularly to said first inner side surface; and said bored hole is coaxial with and communicates into said first recess.

19. The apparatus according to claim 18, wherein said first lever member has a second recess therein that adjoins said first recess and that is coaxial with said bored hole and said first recess, and wherein said second recess has a smaller diameter than said first recess and a greater depth than said first recess as measured from said first inner side surface.

20. The apparatus according to claim 18, wherein said pulling extraction device comprises a first cylinder body having a first external threading, a second cylinder body that adjoins and extends coaxially from said first cylinder body and that has a second external threading and a smaller diameter than said first cylinder body, and a tool-engageable nut head threaded coaxially onto said first external threading on an end of said first cylinder body opposite said second cylinder body, and wherein said second cylinder body is adapted to be threaded into and received in a hole provided in the first end of the connection bolt.

21. An apparatus for releasing a connection bolt arrangement including a connection bolt frictionally engaged in an expansion sleeve, said apparatus comprising:

first and second levers that are pivotably connected to each other to be pivotable about at least one pivot axis and that each respectively have a respective free end offset from said at least one pivot axis and a respective actuated end opposite said respective free end and offset from said at least one pivot axis, wherein said at least one pivot axis is located along said levers between said actuated ends and said free ends;

actuating means for pivotally actuating said first and second levers relative to each other about said at least one pivot axis, wherein said actuating means is arranged between and coupled respectively to said first and second levers at said respective actuated ends thereof;

first means provided at said free end of said first lever for applying a first pushing force to a first end of the expansion sleeve without applying said first pushing force to a first end of the connection bolt which is adjacent to the first end of the expansion sleeve;

second means provided at said free end of said second lever for applying a second pushing force, directed opposite said first pushing force, to a second end of the connection bolt which is opposite the first end of the connection bolt, without applying said second pushing force to a second end of the expansion sleeve which is adjacent to the second end of the connection bolt; and third means provided at said free end of said first lever for applying a pulling force to the first end of the connection bolt;

wherein said pulling force, said first pushing force and said second pushing force together are effective to release the connection bolt from the expansion sleeve.

* * * * *

UNITED STATES PATENT AND TRADEMARK OFFICE

CERTIFICATE OF CORRECTION

PATENT NO. : 6,336,264 B1
DATED : January 8, 2002
INVENTOR(S) : von Borstel et al.

It is certified that error appears in the above-identified patent and that said Letters Patent is hereby corrected as shown below:

Title page
Item [73] Assignee, after "GmbH", insert -- , Hamburg --.

Column 5,
Line 35, after "receiver", replace "rtte" by -- the --.

Column 9,
Line 5, after "244,", replace "therety" by -- thereby --.

Column 14,
Line 39, after "provides", replace "aid" by -- said --.

Signed and Sealed this

Tenth Day of September, 2002

*Attest:*

JAMES E. ROGAN

*Attesting Officer*

*Director of the United States Patent and Trademark Office*